US007971048B2

(12) United States Patent
Datta et al.

(10) Patent No.: US 7,971,048 B2
(45) Date of Patent: Jun. 28, 2011

(54) SYSTEM AND METHOD FOR ESTABLISHING A TRUST DOMAIN ON A COMPUTER PLATFORM

(75) Inventors: Sham M. Datta, Hillsboro, OR (US); Mohan J. Kumar, Aloha, OH (US); Ernest Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 623 days.

(21) Appl. No.: 12/056,452

(22) Filed: Mar. 27, 2008

(65) Prior Publication Data

US 2009/0249050 A1    Oct. 1, 2009

(51) Int. Cl.
*G06F 15/177*    (2006.01)
(52) U.S. Cl. ............... 713/1; 713/2; 713/155; 713/164
(58) Field of Classification Search .............. 713/1, 2, 713/155, 164
See application file for complete search history.

(56) References Cited

U.S. PATENT DOCUMENTS

| 7,480,804 | B2 * | 1/2009 | Bade et al. | 713/181 |
| 7,716,494 | B2 * | 5/2010 | Liu et al. | 713/189 |

* cited by examiner

*Primary Examiner* — Thuan N Du
(74) *Attorney, Agent, or Firm* — Buckley, Maschoff & Talwalkar LLC

(57) ABSTRACT

Embodiments of the invention provide systems and methods associated with a measurement engine in a server platform. In one such embodiment of the invention, the measurement engine hardware verifies/authenticates its own firmware and then system initialization firmware by measuring such firmware and storing measurement results in a register that is not spoofable by malicious code. In this instance, the measurement engine holds the host CPU complex in a reset state until the measurement engine has verified the system initialization firmware. In another such embodiment of the invention, the measurement engine hardware also measures firmware associated with one or more system service processors and stores such measurement results in a register. In this case, the measurement engine holds the system service processors and the host CPU complex in reset until the measurements are completed. Other embodiments are described.

15 Claims, 4 Drawing Sheets

SYSTEM AND METHOD FOR ESTABLISHING A TRUST DOMAIN ON A COMPUTER PLATFORM

FIELD

The application relates generally to computer security, and more specifically, but without limitation, to systems and methods for establishing a trust domain on a computer platform.

BACKGROUND

Computer security refers to information security associated with computer platforms. The objective of computer security is to ensure the confidentiality, integrity, and/or availability of information that is stored or processed on the computer platform. In one respect, computer security may reduce the vulnerability of computer-based information to malicious software. A known method for achieving computer security involves establishing a trust domain that includes only trusted hardware that runs only validated software and firmware.

Conventional methods for establishing a trust domain have many disadvantages. For example, methods that self-validate firmware are vulnerable to spoofing by malicious code. Moreover, since trust domains are typically anchored in host CPU hardware, conventional methods are unable to extend the trust domain to all components of the server platform. This is especially a problem, for instance, when the server platform includes system service processors (SSPs) or other components that are supplied by more than one vendor. For at least these reasons, improved systems and methods for establishing a trust domain are needed.

BRIEF DESCRIPTION OF THE DRAWINGS

The invention will be described below with reference to the accompanying drawings, wherein.

DETAILED DESCRIPTION

The invention will now be described more fully with reference to the figures, in which embodiments of the invention are shown. This invention may, however, be embodied in many different forms and should not be construed as limited to the embodiments set forth herein.

Figure 1:
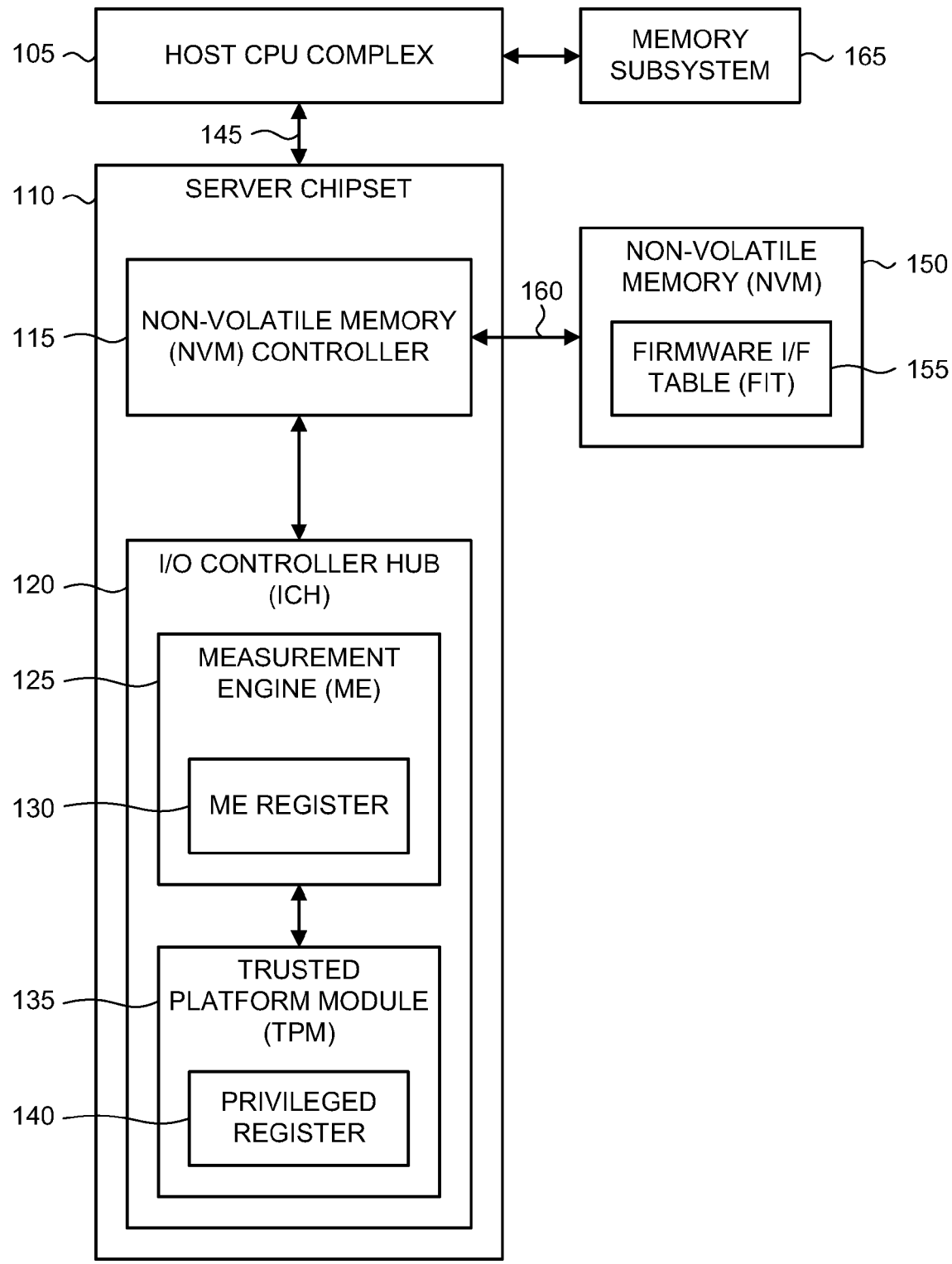
FIG. 1 is a functional block diagram of a server platform, according to an embodiment of the invention.

FIG. 1 is a functional block diagram of a server platform, according to an embodiment of the invention. As illustrated in FIG. 1, the server platform includes a host Central Processing Unit (CPU) complex 105 coupled to a server chipset 110 by a system bus 145. The host CPU complex 105 may include one or more CPU packages (not shown), and each CPU package may contain one or more CPUs, according to application demands. Each CPU package in the host CPU complex 105 may also host one or more memory controllers (not shown). The server platform may include a memory subsystem 165 coupled to the host CPU complex 105.

In the illustrated embodiment, the server chipset 110 includes a non-volatile memory (NVM) controller 115 coupled to an Input/Output Controller Hub (ICH) 120. A Non-Volatile Memory (NVM) 150 is coupled to the NVM controller 115 via a memory bus 160. The NVM 150 may include, for example, Read-Only Memory (ROM), flash memory, magnetic computer storage, or optical computer storage. The NVM 150 stores the Basic Input and Output System (BIOS) code that includes a Firmware I/O Table (FIT) data structure 155.

The ICH 120 is configured for relatively low-speed communications. The ICH 120 includes a Measurement Engine (ME) 125 coupled to a Trusted Platform Module (TPM) 135.

The ME 125 is a microcontroller that functions as an independent execution engine. The ME 125 includes a ME register 130, which may be implemented as a write once register that requires a system reset to rewrite the register. The ME 125 can be configured to measure firmware or other code, for instance, by reading firmware code and performing a hash function on it to verify ownership and/or the binary integrity of firmware. In the illustrated embodiment, the ME 125 is configured to access system firmware (BIOS code) in the NVM 150 via the NVM controller 115.

The TPM 135 includes a privileged register 140 that can securely store the identity (or hash value) of a firmware system. The TPM 135 may also be configured to generate cryptographic keys, manage access to such keys, and may perform functions such as remote attestation, binding, and/or sealed storage.

Variations to the configuration illustrated in FIG. 1 are possible. For example, in an alternative embodiment, the server chipset 110 may include more than one memory controller. Furthermore, the ME 125 and/or the TPM 135 may exist separate and apart from the ICH 120. The ME 125 and/or the TPM 135 may also exist separate and apart from the server chipset 110. Moreover, although the ME register 130 is illustrated and described as a single register, there may be multiple registers contained in the ME 125. In addition, in an alternative embodiment, the ME 125 may be configured to access the NVM 150 without the use of the NVM controller 115.

The server platform illustrated in FIG. 1 and described above may be configured to perform the process illustrated in FIG. 2 and described below.

Figure 2:
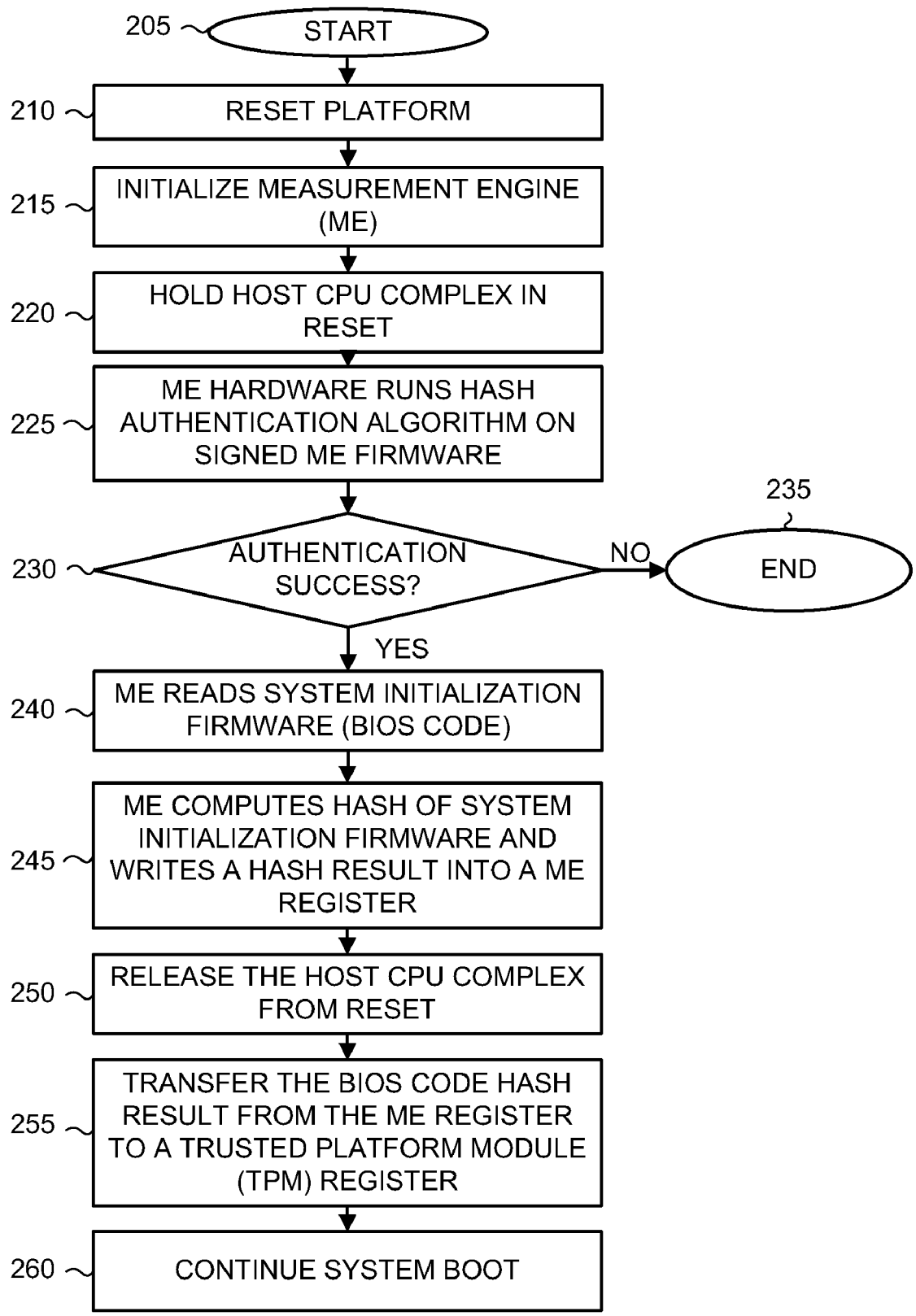
FIG. 2 is a flow diagram of a server platform boot process, according to an embodiment of the invention.

FIG. 2 is a flow diagram of a server platform boot process, according to an embodiment of the invention. After starting in step 205, resetting the platform in step 210 causes the process to initialize the ME 125 in step 215. In step 220, the ME 125 holds the host CPU complex 105 in a hardware reset state. Step 220 may be implemented, for example, by reporting to the host CPU complex 105 that a Quick Path Interconnect (QPI) associated with the system bus 145 is in training. Alternatively, platform electronics controlled by the ME 125 may hold the host CPU complex 105 in a reset state.

In step 225, the ME 125 hardware reads its firmware (the code that controls ME 125 operation) and hashes (performs the HASH function on) the ME firmware. The hash function utilized in step 225 may be, for example, a SHA-128 algorithm or other cryptographic method, according to security requirements. For instance, in another embodiment of the invention, a SHA-256 algorithm may be used for a higher level of security. Step 225 may include storing this HASH value to an internal register (not shown in FIG. 1, but similar to ME 125 register 130).

In conditional step 230, the process determines whether the ME firmware is authentic. For example, the ME 125 may authenticate its firmware by comparing the HASH value to a stored value. Alternatively, the ME 125 hardware may authenticate its firmware based on a public/private key pair. If conditional step 230 is not satisfied (i.e., the ME 125 is not able to authenticate its firmware), then the process terminates in step 235.

If conditional step 230 is satisfied, then the ME 125 reads the system initialization firmware (BIOS code that the host CPU complex 105 executes) in step 240. During execution of step 240, the ME 125 searches the NVM 150 for the FIT 155 data structure to identify the system initialization firmware that runs on the host CPU complex 105 in response to a reset.

The ME 125 hashes the system initialization firmware and writes a hash result into write once ME register 130 in step 245. The hash utilized in step 245 could be a SHA-128 algorithm or any other hash method (e.g., a SHA-256 algorithm), according to design choice.

The ME 125 releases the host CPU complex 105 from the hardware reset state in step 250. Once the host CPU complex 105 is released from reset, the host CPU complex 105 fetches and executes BIOS code indicated by the reset vector, thus invoking the measured system initialization firmware (BIOS code). Among other things, the measured system initialization firmware sets up the TPM 135. Step 250 may be implemented, for example, by reporting to the host CPU complex 105 that Quick Path Interconnect (QPI) training on system bus 145 is complete. Alternatively, platform electronics controlled by ME 125 may release the host CPU complex 105 from the reset state.

Once The TPM 135 is setup by host software, a trusted host software can trigger the ME 125 (for example, by writing to a ME 125 command register) to perform a cryptographic hash_extend operation that transfers the hash result from the ME register 130 to a privileged register 140 in step 240. The privileged register 140 can be a Platform Configuration Register (PCR) of the TPM 135. The ME 125 may also store a status flag bit inside ME 125 hardware to indicate (to trusted software that runs later) that a hash_extend operation to TPM 135 has been done. In some embodiments of the invention, the ME 125 may execute only a single hash_extend operation, even if it receives multiple triggers.

Accordingly, a secure application can seal secrets to the measurements in the TPM 135 and ensure that the secrets can only be retrieved if the measurements match on a subsequent boot. In some embodiments of this invention, the ME 125 is able to distinguish between a system reset and a sleep state transition to ensure that during resume from sleep state, the measurement observed matches the measurement already recorded in the ME register 130. This unique ability of ME 125 can guarantee that only code in trusted domain is executed upon wakeup from a sleep state.

Variations to the process illustrated in FIG. 2 are possible. For example, the process could be initialized in step 205 by a power up or other boot/reboot event other than a reset. Furthermore, the measurements indicated in steps 225 and 245 could be performed by cryptographic methods other than a hash. Moreover, instead of first writing a BIOS code hash result to the ME register in step 245 and later transferring the BIOS code hash result to the TPM 135 in step 255, the ME 125 may be configured to directly transfer the BIOS code hash result to the TPM 135. In addition, although the process illustrated in FIG. 2 was described above with reference to components illustrated in FIG. 1, the process illustrated in FIG. 2 could be executed by a computer platform having a different architecture.

Figure 3:
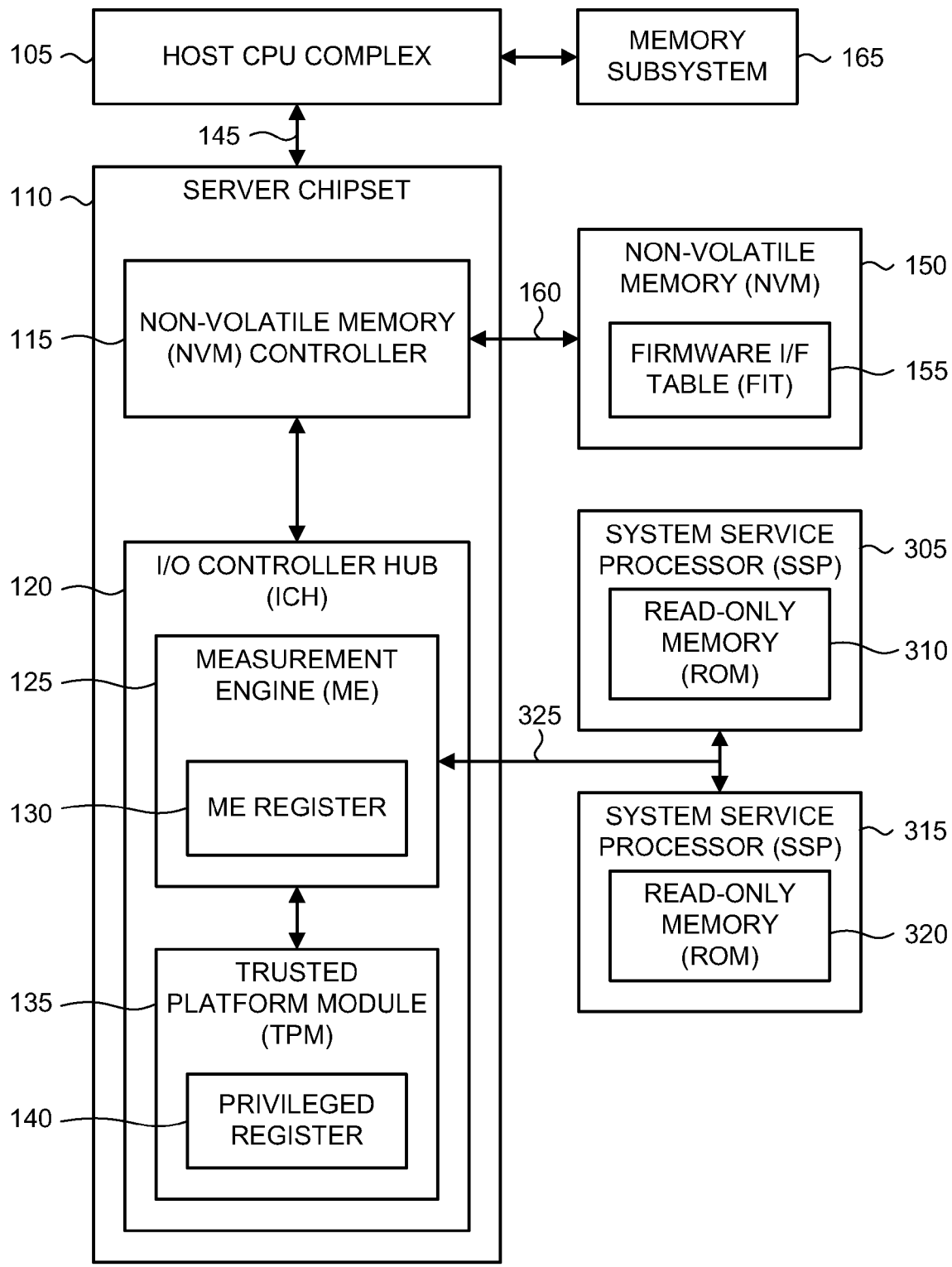
FIG. 3 is a functional block diagram of a server platform, according to an embodiment of the invention.

FIG. 3 is a functional block diagram of a server platform, according to an embodiment of the invention. Features of the host CPU complex 105, server chipset 110, NVM 150, and memory subsystem 165 are the same or substantially similar to those described above with reference to FIG. 1. Accordingly, a description of those features will not be repeated below.

The server platform in FIG. 3 further includes System Service Processors (SSPs) 305 and 315 coupled to the ME 125 via a dedicated bus 325. The SSPs 305 and 315 may be, for example, platform-based microcontrollers that participate, for example, in executing RASM (Reliability, Availability, Serviceability, and Manageability) features on the server. The SSPs 305 and 315 include Read-Only Memories (ROMs) 310 and 320, respectively. The ME 125 is configured to read firmware from the ROMs 310 and 320 via the dedicated bus 325.

Variations to the configuration illustrated in FIG. 3 are possible. For example, in addition to the variations mentioned with respect to FIG. 1, there may be one SSP, two SSPs, or more than two SSPs coupled to the ME 125.

The server platform illustrated in FIG. 3 and described above may be configured to perform the process illustrated in FIG. 4 and described below.

Figure 4:
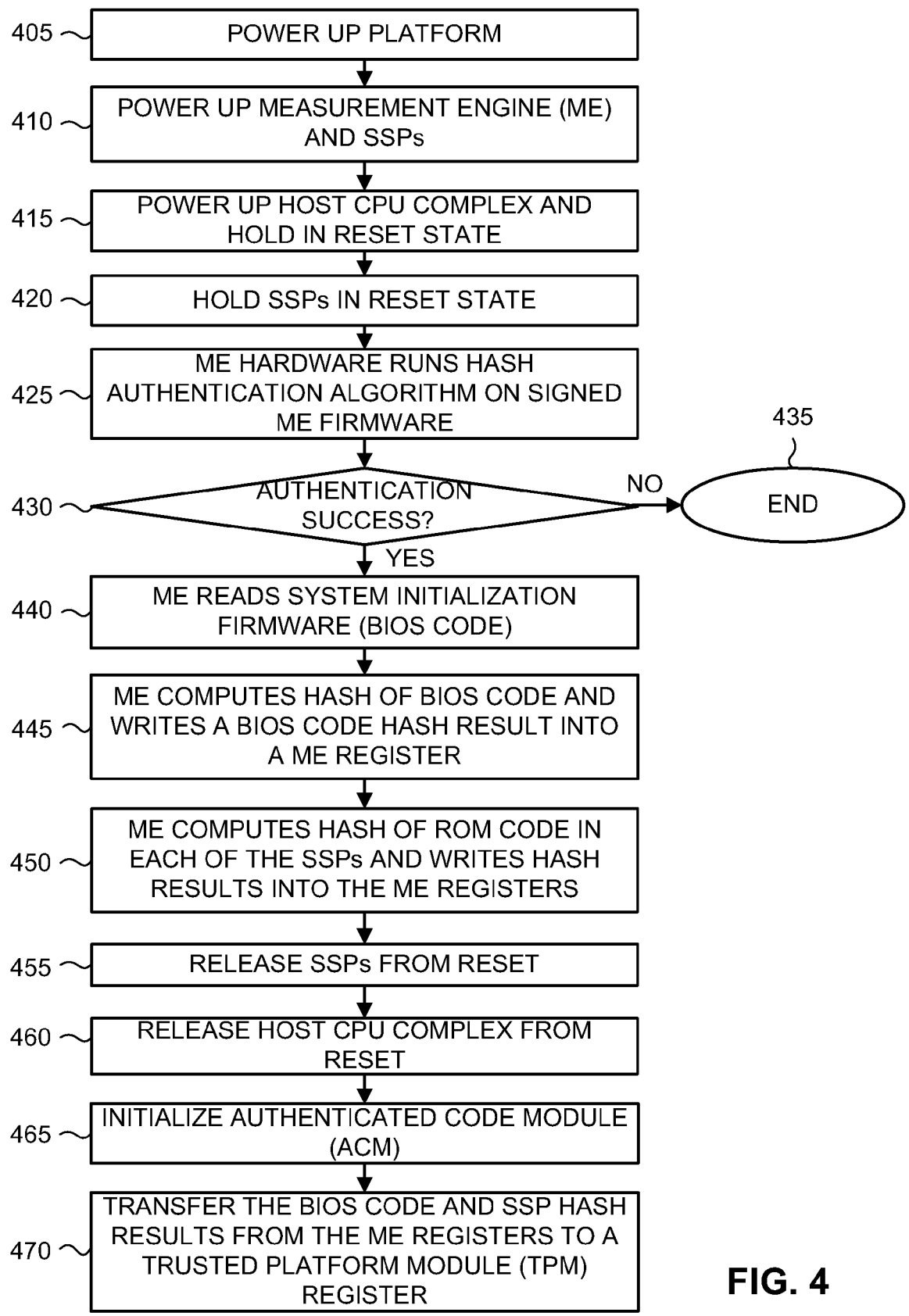
FIG. 4 is a flow diagram of a server platform boot process, according to an embodiment of the invention.

FIG. 4 is a flow diagram of a server platform boot process, according to an embodiment of the invention. After powering up the platform in step 405, the process powers up the ME 125 and SSPs 305 and 315 in step 410. Next, the process powers up the host CPU complex 105 and holds it in a hardware reset state in step 415. Then, in step 420, the ME 125 holds the SSPs 305 and 315 in a reset state.

In step 425, the ME 125 hardware measures its own firmware, for example, by hashing the firmware. Step 425 may include writing the firmware hash result to the ME register 130.

In conditional step 430, the ME 125 hardware determines whether the ME firmware is authentic. Step 430 may be performed, for example, by comparing the ME firmware hash to a stored value. Alternatively, step 430 may be performed using a public/private key pair. If the ME hardware 125 cannot authenticate the ME firmware, then the boot process terminates in step 435.

If the ME firmware is authenticated, then the ME 125 reads BIOS code in step 440 as described above with reference to step 240. Next, the ME 125 computes a hash of the BIOS code and writes a hash result of the BIOS code into a ME 125 register in step 445 as described above with reference to step 245.

In step 450, the ME 125 reads and hashes ROM code from each of the SSPs 305 and 315. Step 435 may be performed sequentially for each of the SSPs 305 and 315. Also in step 450, the ME 125 cryptographically hash_extends the SSP hash results into the ME register 130.

In step 455, the ME 125 releases the SSPs 305 and 315 from reset. Then, in step 460, the ME 125 releases the host CPU complex 105 from reset. Similar methods as described with reference to step 250 may be used here in releasing the host CPU complex 105 from the reset state. In step 465, the host CPU complex 105 executes and selects a single Boot Strap Processor (BSP) to continue BIOS code and initializes an Authenticated Code Module (ACM). Finally, in step 470, the authenticated code module transfers the SSP hash results from the ME register 130 to the privileged register 140 of the TPM 135. Once the TPM 135 is initialized, trusted host software can trigger step 470, for example, by writing to a ME 125 command register. The transfer in step 470 may be or include a cryptographic hash_extend operation that transfers the hash result from the ME register 130 to a privileged register 140 in the TPM 135.

Variations to the process illustrated in FIG. 4 are possible. For example, the process could be initialized in step 405 by a reset or other boot/reboot event other than a power up. Furthermore, the measurements indicated in steps 425, 445, and 450 could be performed by cryptographic methods other than a hash function, without deviating from the spirit and scope of this invention. In addition, although the process illustrated in FIG. 4 was described with reference to components illustrated in FIG. 3, the process illustrated in FIG. 4 could be executed by a computer platform having a different architecture.

In embodiments of this invention, it is also possible for the NVM system coupled to the host CPU complex and holding the BIOS code (the code module that is executed by the host complex at reset) to also hold other firmware code modules that may be executed by the ME 125 and/or by SSPs 305 and 315. These embodiments may use flash hardware architectures called Serial Peripheral Interface (SPI) flash devices that have the ability to host several code modules in separate configurable partitions.

It will be apparent to those skilled in the art that additional modifications and variations can be made without deviating from the spirit or scope of the invention. For example, although the embodiments described herein refer to computer server environments, the invention could be applied to computer platforms other than server platforms. Moreover, features of the methods described above with reference to FIGS. 2 and 4 can be combined into process sequences that are not explicitly shown. Thus, it is intended that the present invention cover any such modifications and variations of this invention provided they come within the scope of the appended claims and their equivalents.

The invention claimed is:

1. A computer platform comprising:
a host central processing unit (CPU) complex having at least one CPU;
a non-volatile memory (NVM) coupled to the host CPU complex, the NVM configured to store system initialization firmware, the host CPU complex configured to execute the system initialization firmware; and
a measurement engine (ME) coupled to the host CPU complex and the NVM, the ME configured to hold the host CPU complex in a hardware reset state, to measure the ME firmware and the system initialization firmware to establish a trust domain on the computer platform, and to release the host CPU complex from the hardware reset state based on said measurements, wherein the host CPU complex is held in the hardware reset state by reporting to the host CPU that a Quick Path Interconnect (QPI) associated with a system bus is in training.

2. The computer platform of claim 1, wherein the ME includes a ME register, the ME configured to write a result of a system initialization firmware measurement to the ME register once per boot session.

3. The computer platform of claim 2, wherein the ME register is a write once register.

4. The computer platform of claim 2, further comprising a trusted platform module (TPM) coupled to the ME, the ME configured to transfer the result from the ME register to the TPM.

5. The computer platform of claim 4, wherein the ME is configured to transfer the result from the ME register to the TPM based on a trigger from an authenticated code module (ACM).

6. The computer platform of claim 4, wherein the ME is configured to transfer the result from the ME register to the TPM based on a trigger from the system initialization firmware.

7. The computer platform of claim 4, wherein the ME includes a status bit flag, the status bit flag indicating whether the ME has transferred the result from the ME register to the TPM.

8. The computer platform of claim 4, further comprising an input/output controller hub coupled to the host CPU complex, the input/output controller hub including the ME and the TPM.

9. The computer platform of claim 1, further comprising at least one system service processor (SSP) coupled to the ME, each of the at least one SSPs including a read-only memory (ROM), the ME configured to read SSP firmware from the ROM of each of the at least one SSPs, the ME further configured to measure the firmware from the ROM of each of the at least one SSPs to extend the trust domain to the at least one SSPs.

10. The computer platform of claim 9, further comprising a dedicated bus coupled between the ME and the at least one SSP.

11. A method for booting a computer platform, comprising:
initializing a measurement engine (ME);
holding a host central processing unit (CPU) complex in a hardware reset state;
measuring ME firmware to produce a first result;
measuring system initialization firmware to produce a second result, the system initialization firmware associated with the host CPU complex; and
based upon said first and second results, releasing the host CPU complex from the hardware reset state, wherein said holding the host CPU complex in the hardware reset state comprises reporting to the host CPU complex that a Quick Path Interconnect (QPI) associated with a system bus is in training.

12. The method of claim 11, wherein measuring the ME firmware includes hashing the ME firmware and measuring the system initialization firmware includes hashing the system initialization firmware.

13. The method of claim 11, further comprising:
writing the second result to at least one ME register;
after releasing the host CPU complex from the reset, transferring the second result from the at least one ME register to a privileged register in a trusted platform module (TPM);
before measuring the ME firmware, holding a system service processor (SSP) in reset;
measuring code associated with the SSP to produce a third result; and
releasing the SSP from the reset.

14. The method of claim 13, wherein measuring the code associated with the SSP includes hashing the code.

15. The method of claim 13, further comprising:
writing the third result to the at least one ME register; and
after releasing the SSP from the reset, transferring the second result from the at least one ME register to the privileged register in the TPM.

* * * * *